US012632040B2

(12) United States Patent
Schramm et al.

(10) Patent No.: US 12,632,040 B2
(45) Date of Patent: May 19, 2026

(54) COMPUTER-IMPLEMENTED METHOD FOR GENERATING CONTROL PARAMETERS FOR A PROCESS CONTROL SYSTEM

(71) Applicant: BASF SE, Ludwigshafen (DE)

(72) Inventors: Karsten Schramm, Ludwigshafen (DE); Nuria Pascual Martinez, Ludwigshafen (DE); Julio Enrique Palacios Koo, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 342 days.

(21) Appl. No.: 18/037,824

(22) PCT Filed: Nov. 23, 2021

(86) PCT No.: PCT/EP2021/082702

§ 371 (c)(1),
(2) Date: May 19, 2023

(87) PCT Pub. No.: WO2022/112258

PCT Pub. Date: Jun. 2, 2022

(65) Prior Publication Data

US 2024/0004370 A1      Jan. 4, 2024

(30) Foreign Application Priority Data

Nov. 24, 2020    (EP) .................................... 20209598

(51) Int. Cl.
G05B 19/418        (2006.01)
G05B 19/10         (2006.01)
(52) U.S. Cl.
CPC ......... *G05B 19/418* (2013.01); *G05B 19/106* (2013.01)

(58) Field of Classification Search
CPC . C07D 213/80; C07D 213/803; C07D 309/28
See application file for complete search history.

(56) References Cited

U.S. PATENT DOCUMENTS 6,093,215 A * 7/2000 Buxton .................. G06F 9/543
717/177
6,725,428 B1    4/2004 Pareschi et al.
(Continued)

FOREIGN PATENT DOCUMENTS

EP          2595099 A1    5/2013
JP      H05501624 A    3/1993
(Continued)

OTHER PUBLICATIONS

International Application No. PCT/EP2021/082702, International Search Report and Written Opinion, mailed Feb. 10, 2022.

*Primary Examiner* — Kidest Worku
(74) *Attorney, Agent, or Firm* — Lowenstein Sandler LLP

(57)                ABSTRACT

The invention refers to a method for generating control parameters for a process control system (131, 132) utilized for batch production of a specific product. The method is configured to be used in a MES (120) and comprises a) receiving, by a receiving unit, a product recipe from an ERP system (110), wherein the product recipe comprises information indicative of production requirements for a specific product in a batch production process, b) generating, by a generating unit, a parameter set based on the product recipe, wherein the parameter set is configured to be implemented in the process control system (131, 132), and c) implementing, by an implementing unit, the generated parameter set into the process control system before starting the production of the specific product.

13 Claims, 3 Drawing Sheets

(56)                    References Cited

U.S. PATENT DOCUMENTS

| | | | |
|---|---|---|---|
| 8,359,536 B2 | 1/2013 | Carsten et al. | |
| 2003/0200130 A1 | 10/2003 | Kall et al. | |
| 2008/0010641 A1* | 1/2008 | Zhao ....................... | G06F 9/542 |
| | | | 718/101 |
| 2008/0015714 A1* | 1/2008 | Rudnick ................ | G05B 15/02 |
| | | | 700/52 |
| 2011/0173529 A1* | 7/2011 | Wagner .................. | G06Q 10/06 |
| | | | 715/235 |
| 2013/0123964 A1* | 5/2013 | Cooper ................... | G06F 3/067 |
| | | | 700/97 |
| 2014/0067105 A1 | 3/2014 | Reggio et al. | |
| 2016/0070258 A1* | 3/2016 | Raviola ................. | G06Q 10/06 |
| | | | 700/100 |

FOREIGN PATENT DOCUMENTS

| | | | |
|---|---|---|---|
| JP | H07334572 A | 12/1995 |
| JP | H10214296 A | 8/1998 |
| JP | 2995482 B2 | 12/1999 |
| JP | 2007109022 A | 4/2007 |
| JP | 5045150 B2 | 10/2012 |
| JP | 2015038769 A | 2/2015 |
| WO | 2020182761 A1 | 9/2020 |

* cited by examiner

COMPUTER-IMPLEMENTED METHOD FOR GENERATING CONTROL PARAMETERS FOR A PROCESS CONTROL SYSTEM

CROSS-REFERENCE TO RELATED APPLICATIONS

This is the U.S. national phase of International Application No. PCT/EP2021/082702, filed Nov. 23, 2021, which claims the benefit of European Patent Application No. 20209598.0, filed Nov. 24, 2020.

FIELD OF THE INVENTION

The invention relates to a computer-implemented method, a manufacturing execution system utilizing the computer-implemented method and a computer program product for generating control parameters for a process control system utilized for batch production of a specific product.

BACKGROUND OF THE INVENTION

In modern industrial production processes often an enterprise control system is utilized, which allows for an efficient and structured control and management of production operations or processes in industrial plants. Generally, these enterprise control systems comprise a plurality of control levels that can also be associated with a physical infrastructure necessary for the production and are often described in form of a layer model. In this layer model each layer, or level, refers to actual processes performed in the respective layer and also to the machinery performing these actual processes. Level 0 refers to the actual physical production processes and the technical infrastructure performing the actual physical production processes. Level 1 refers to the processes and devices that can sense and directly manipulate the actual physical processes of the level 0. Level 2, which can sometimes be omitted depending on the infrastructure and computational intelligence of the devices and processes in level 1, refers to the first controlling layer that allows a supervising, monitoring and controlling of these physical processes, for instance, by utilizing the processes and the devices of level 1. At level 3 the overall production workflows, sometimes in a plurality of production plants, are monitored, documented and controlled, for instance, by monitoring and controlling individual control systems of different plants for producing a desired product. At level 4 a general process logistics and management system is provided that allows to control and manage different production processes, for instance, by specifying and managing the material used for producing a product.

Generally, each of these layers or levels is associated with a specific computer-implemented infrastructure that is based on the concepts defining the respective layer. However, for security purposes the different computational infrastructures and control systems are implemented in a decentralized manner and communication between the systems of different levels is often very restricted. Thus, for initiating a production process, that starts from the level 4 control system providing the basic parameters and data for the production of a specific product and finally has to lead to an implementation of concrete and specific process controlling parameters into the devices of layer 1, often inefficient and unfaithful processes or even work-around-solutions have to be utilized, to avoid the computational security restrictions of the layer implementation system.

It would therefore be desired to provide a method that allows for a more accurate and efficient implementation of process details for a specific product into the production devices while still utilizing the principles of the generally applied layer production system.

SUMMARY OF THE INVENTION

It is an object of the present invention to provide a computer-implemented method, a manufacturing execution system utilizing the computer-implemented method and a computer program product that allow to improve the accuracy and efficiency of a generation process for control parameters for a process control system.

In a first aspect, a computer-implemented method for generating control parameters for a process control system utilized for batch production of a specific product is presented, wherein the method is configured to be used in a manufacturing execution system (MES) and comprises a) receiving a product recipe from an enterprise resource planning (ERP) system, wherein the product recipe comprises information indicative of production requirements for a specific product in a batch production process, b) generating a parameter set based on the product recipe, wherein the parameter set is configured to be implemented in the process control system, and c) implementing the generated parameter set into the process control system before starting the production of the specific product, wherein the method further comprises providing a product template, wherein the product template comprises a plurality of parameter settings for the control parameters with respect to a specific product, wherein the parameter set is generated based on the product template.

Since the method steps of receiving a product recipe from the ERP system, generating the parameter sets and implementing the parameter sets into the process control system are performed as part of the MES, a very efficient communication and processing within the utilized enterprise control system is provided. Moreover, since the MES, i.e. the processing capability at level 3, is utilized for implementing the method, data and communication restrictions due to security reasons can be complied with while at the same time the generation and implementing of the parameter sets becomes more efficient and accurate, i.e. less prone to utilizing work-around-solutions or inefficient communication processes. Thus, the method allows to improve the accuracy and efficiency of a generation process for control parameters for a process control system. Moreover, since the generating of the parameter set is performed as part of the MES and not, as common, as part of the control layer of an industrial plant, the parameter sets can be accurately and efficiently generated also in cases in which industrial plants should be used with old and outdated computational soft and/or hardware infrastructure. Thus, the compatibility with such legacy systems is increased.

Moreover, utilizing a product template has the effect that the parameter settings for a parameter set do not have to be completely generated again each time similar products should be produced. Instead already existing parameter settings can be stored in form of the product template and be used, optionally in a modified manner, for generating the parameter set. Thus, the generation of the parameter set becomes less computational extensive, i.e. not for every production recipe the parameter set has to be generated completely anew by using complex rules or human machine interaction processes.

Preferably, the computer-implemented method is adapted for generating control parameters for a process control system at an industrial plant, wherein the industrial plant is controlled utilizing an enterprise control system comprising a physical process layer, i.e. level a device layer, i.e. level 1, an optional control layer, i.e. level 2, an operational layer, i.e. level 3, and a supervisory layer, i.e. level 4. The process control system is generally configured for controlling a production process of a specific product in an industrial plant, in particular, by monitoring and controlling one or more means of the technical infrastructure of the industrial plant that is utilized for producing the specific product. Preferably, the process control system refers to a distributed control system (DCS) or to a programmable logic controller (PLC) system. In particular, if a control layer is utilized by the industrial plant, it is preferred that the process control system refers to a DCS system, whereas, if the control layer is omitted and only a direct device layer is present in the industrial plant, it is preferred that the process control system refers to the PLC system. Thus, the process control system can either be regarded as being part of the level 1 structures or as part of the level 2 structures, or a combination of these.

The control parameters refer generally to the parameters that, if utilized by the process control system, lead to the production of a specific product. In particular, the control parameters are indicative of specific production parameter values for the technical infrastructure of the industrial plant that allow the industrial plant to produce the specific product. For example, the control parameters can be indicative of a temperature for a heater, of opening times for valves controlling the flow of one or more components for producing the product, of specific parameters for a milling process, of power settings of a pump or motor, of pressure provided by a compressor, etc.

The MES is defined as being part of the operational layer and is communicatively coupled to the process control system of the device and/or control layer of the industrial plant and further to the supervisory layer comprising the ERP system. Generally, the control layer or device layer and the supervisory layer are isolated from each other, i.e. communication can only be performed between directly neighboring layers of the enterprise control system.

In a first step, the method comprises receiving the product recipe from the ERP system. Thus, the MES being a part of the operational layer receives in this step data, i.e. the product recipe, from the supervisory layer utilizing the ERP system. The product recipe comprises information indicative of production requirements for a specific product in a batch production process. Generally, a batch production refers to a production process or method in which products are made as specific groups or amounts within a timeframe. The batch production has to be differentiated from a continuous production in which a product is produced continuously. Thus, for each batch production, i.e. for each batch of a specific product, the process control system has to be configured individually for the specific batch. The information provided by the product recipe comprises, for instance, information indicative of the kind of product to be produced, the amount of the specific product to be produced, the materials necessary for producing the specific product, the availability of these materials, an identification number for the batch production, individual requirements of the finalized product like a desired packaging or packaging size, quality, or packaging label, etc.

In a second step, the computer-implemented method comprises generating a parameter set based on the product recipe. The parameter set comprises the control parameters and values for the control parameters for the process control system and is configured to be implemented in the process control system. The parameter set can be generated, for instance, by utilizing a parameter set storage comprising a plurality of parameter sets, wherein each parameter set is associated with a specific product. For example, an identification of the specific product can be stored together with a parameter set referring to the specific product in the parameter set storage. The generating of the parameter set can then refer to determine the identification of the specific product from the product recipe and reading out the parameter set associated with the identification. However, the generating of the parameter set can also refer to more sophisticated processes in which, for instance, the information provided by the product recipe is utilized to amend one or more control parameters provided by an already stored parameter set associated with the specific product individually for the specific batch production. For example, a stored parameter set for a specific product might comprise a control parameter value for the size of the packaging or the amount of product to be produced such that the generating of the parameter set comprises using the information on a packaging size and/or amount of product to be produced from the product recipe and amending or setting the parameter values of the control parameters of the parameter set accordingly. Moreover, the generating of the parameter set can also comprise adapting a parameter set already stored in a parameter set storage for a specific product to the specific technical infrastructure of the industrial plant that is utilized for the production of the specific product. For example, if the parameter set indicates amounts and flow velocities for material utilized for the production of the specific product, the generating of the parameter set can comprise creating from these amounts and flow velocities as control parameters valve opening times for specific valves of the production plant, if the process control system of the product plant does not allow for directly setting the amounts and flow velocities.

In particular, a product template is provided, wherein the product template comprises a plurality of parameter settings for the control parameters with respect to a specific product, wherein the parameter set is generated based on the product template. The product template can be stored together with other product templates on a product template storage and can be provided for generating the parameter set from the product template storage. Preferably, for each specific product at least one product template is provided, for instance, by being stored on the product template storage, wherein the providing of the product template for generating the parameter set comprises selecting the product template from the plurality of product templates, that refers to a specific product being indicated by the product recipe. For example, each product template can be stored together with an identification of the specific product to which the product template refers and the generating of the parameter set can comprise determining the identification for the specific product from the product recipe and selecting the respective product template based on the determined identification. A product template can comprise a plurality of parameter settings, i.e. parameter values, for the control parameters of the parameter set of a specific product. Preferably, the product template comprises all parameter settings for the control parameters of the specific product. However, alternatively the product template can comprise only some of the parameter settings for the control parameters. Control parameters that have to be included into the parameter set for which the product template does not comprise parameter settings can then be set, for instance, based on the respective information provided by the product recipe in order to generate the parameter set. For example, the product template can comprise all parameter settings for the control parameters except the parameter settings related to the batch amount and the packaging of the product, wherein the step of generating a parameter set can then comprise identifying this information for the product recipe and using implemented rules to set the control parameters that are not already provided by the product template. Such rules can refer, for instance, to functional relationships between the product requirements and the technical infrastructure of a specific production plant. For example, the functional relationship can refer to a relation between a packing size and an opening time of a valve used for filling the package with the product. However, such rules can refer to lookup tables or can be provided by more sophisticated machine learning systems.

In the last step, the generated parameter set is implemented into the process control system before starting the production of the specific product. In particular, the implementing comprises the providing of the generated parameter set, generated by the MES in the operational layer, to the process control system in the control or process layer. Moreover, the implementing of the generated parameter sets into the process control system can comprise a monitoring and controlling that ensures that the parameter values of the control parameters provided by the parameter set are set within or by the process control system correctly.

In an embodiment, the product template comprises a) at least one user element referring to a parameter setting that is settable and/or changeable by a user input and/or b) at least one system element referring to a parameter setting that is not settable and/or not changeable by a user input, wherein a system element is provided in form of a placeholder to the user in the product template, in order to indicate that the respective parameter setting of the product template is not settable and/or not changeable by the user. User elements can, for instance, be utilized to allow a user to adapt a control parameter to a specific situation of the production plant. For example, a user element can refer to a parameter setting, i.e. a parameter value, which is generally preferred for a respective control parameter, however, if a specific production plant might need an amended parameter setting, the user element allows the user to implement this amended parameter setting. Such amendments might become necessary due to changes, in particular, short term changes, in the technical infrastructure of the plant, for example due to sudden failures of some of the technical infrastructure. Moreover, also the experience of a user familiar with the specific product production in a specific production plant might indicate that an amendment of the parameter setting is suitable for this specific production plant. In contrast to the user element that allows a user to interfere with the parameter settings, system elements are provided such that no amendments and/or settings of the parameter setting by a user is possible. Accordingly, a user cannot influence a system element. System elements can refer to control parameters that are essential for the production of a specific product, like a temperature setting, a reaction time, reaction materials, etc., wherein changes in the settings of these control parameters would lead to quality decreases or even the complete failure of the production of the specific product. Preferably, the at least one system element refers to a parameter setting that is set based on the product recipe and thus might not even comprise a specific value, i.e. parameter setting, in the product template. In this embodiment, the system element can refer to parameters like a product identification number, a batch identification number, identification numbers of the materials to be used for the specific product, etc. that are essential for the correct production and identification of the specific product and can only be provided by the ERP system in the supervisory layer as part of the product recipe. Since the system elements are indicated to the user by providing place holders, a user can directly be made aware that these parameter settings, i.e. parameter values, cannot and/or should not be set or amended by the user, but are instead either only provided by the product template or by the product recipe.

Since the template comprises user elements and system elements, it can be ensured that only the parameter settings are changed that are allowed to be changed, wherein parameter settings that are essential for the production process are protected from any intentional or unintentional change. Thus, the accuracy of the generation of the parameter set can be improved and the correct production of the product can be ensured. Moreover, since the system parameters that cannot be set by a user are provided as placeholders to a user, the user becomes directly aware that these parameters are not settable by a user. Thus, he/she can directly ignore these parameters and concentrate on the user parameters for controlling or modifying. Accordingly, the user is assisted in his/her task in a human computer interactive process of checking, modifying and/or confirming a generated parameter set.

In an embodiment, the product template comprises a link to a master template such that at least some of the parameter settings are provided as part of the master template, wherein in a master template parameter settings are provided that are common for a plurality of specific products. In particular, specific products might only differ by a desired packaging or production amount but not in the physical product itself. In these cases, the parameter settings for the control parameters utilized for producing the physical product itself can be stored in a master template, whereas the more specific parameter settings like the packaging used or the amount of product to be produced are stored in the product template. Moreover, the master template can also be utilized for related processes, for instance, processes in which related products should be produced which might only be different in one or more process steps, for instance, only in one or more materials used for producing these products. Also in these cases, the common parameter settings can be stored as part of a master template, while the specific parameter settings are stored in the product template comprising the link to the master template. This structure of the product templates allows to reduce the complexity and storage capability of the computing system utilizing the production and master template. In a preferred embodiment, the method comprises generating the parameter set based on the product template by extracting the parameter settings provided by the product template and by following the link to the master template and also extracting the parameter settings provided by the master template, wherein the parameter set then comprises the parameters provided by the product template and the parameters provided by the master template.

Since the master template is utilized to store parameter settings that can be used in a plurality of production processes, i.e. for a plurality of production recipes, not for all production recipes a complete parameter set has to be stored. Thus, less storage space has to be provided for generating a parameter set.

In an embodiment, a master template is generated by storing on a master template storage at least a part of a product template comprising parameter settings for a specific product that are common also to at least one other specific product. For example, a user supervising product production can indicate that one or more values of control parameters of a parameter set are usable for the production of a plurality of products and can then initiate the generation of a master template comprising these values for the control parameters. Moreover, also the process control system or the MES can be adapted to determine that for different products the same values for some control parameters have been utilized and to initiate the generation of a master template for these control parameters.

In an embodiment, the method further comprises providing information indicative of a previously performed batch production process, wherein the parameter set is generated further based on the provided information indicative of a previously performed batch production process. For example, the parameter set can be generated in this case based on predetermined rules or relations that describe, for instance, a relationship between previous settings of control parameters of a specific technical infrastructure and following parameter settings. For example, if in a previous batch production a heater was utilized that was set to a first temperature and thus is already at a specific temperature, parameter settings for a heating-up process of the heater in a following batch production can be omitted or can be amended to allow for an optimal following batch production. Parameter settings for the control parameter provided by a template can be amended based on the functional rules or relations when generating the parameter set for a following specific product.

In a preferred embodiment, the information indicative of a previous batch production process comprises information indicative of a difference between the previous batch production process and the current batch production process or the difference is determined based on the information indicative of a previous batch production process, wherein the information indicative of a previous batch production process is indicative of the one or several previously employed parameter sets, wherein the parameter set is generated based on the difference such that it comprises only control parameters differing from the parameters of the previously employed parameter set. In particular, if related products are produced subsequently, for instance, products that only differ in the amount or packaging, generating again a complete parameter set with all control parameters and implementing again all control parameters is not necessary, since only some of the control parameters have to be changed for the new specific product. Thus, generating and implementing as new parameter set a parameter set that only comprises control parameters differing from the parameters of the previously employed parameter set, reduces the computational time and complexity for subsequent batch production processes.

Since the generation of the parameter set is further based on information of a previous batch production process, as described above, parameter settings that do not have to be changed or that can be modified for a smoother start of the follow-up production can be identified and treated accordingly. This allows for a more efficient transition from the production of one specific product to the next.

In an embodiment, the method further comprises locking the parameter set, after the production of the specific product has started, by storing the parameter set as being used during the production of the specific product. Moreover, in an embodiment, the method further comprises locking a product template, after the parameter set has been generated based on the product template, by storing the product template. Locking a parameter set and/or a product template by storing the parameter set and/or the product template that are utilized for the production of the specific product, preferably, after the start of the production of the specific product, allows to accurately follow and retrace the production process of the specific product. For example, if after the start of the production process problems with the produced specific product occur, the locked parameter set and/or product template allow to very accurately understand and reproduce how the product was produced and where an error of failure might have caused the problems with the specific product.

Since the used parameter set and/or the product template are locked, the documentation of the complete production process can be ensured. This leads to an increased security of the batch production process.

In an embodiment, the method further comprises providing feedback information from the process control system during the batch production of the specific product, wherein based on the feedback information the parameter set is revised. Feedback information provided, for instance, by sensors being part of the process control system allows to adapt the production process and in particular the parameter set in real time. For example, the feedback information might indicate that a mill for milling particles does not provide the desired milling efficiency such that it might be necessary to increase the milling time of the specific product by amending the respective control parameter and the parameter set controlling the mill. The revising of the parameter set can be based on implemented rules or functional relations between the feedback information from the technical infrastructure, a currently set control parameter, and an amendment of this control parameter. Moreover, the revising can also be performed in cooperation with a user, for instance, by providing the feedback information and potentially affected control parameters of the parameter set to a user supervising the production of this specific product and allowing a user in this case to revise these control parameters of the control parameter set.

Since feedback information is used for revising the parameter set, acute situations can be taken into account when generating the parameter set for the batch production, as described above. This allows for a direct intervention into the production process that goes beyond general control and supervising processes, wherein the possibility to revise parameter sets on the level of the MES allows to increase the efficiency of the production process.

In an embodiment, the method further comprises providing production change information from the ERP system during the batch production of the specific product, wherein the production change information is indicative of a desired change in the production of the specific product, wherein based on the production change information the parameter set is revised. In particular, the production change information refers to short term production change information that is provided after the production of the specific product has already started. For example, if the demand for a specific product has suddenly increased, the ERP system might provide a new amount for the specific product as production change information to the MES, wherein the MES can then revise the control parameters of the parameter set referring to this change in the amount of production and implement the new control parameter set, in particular, the new control parameters, into the process control system during the running of the production. Preferably, the generating of the parameter set comprises indicating at least one parameter in the parameter set for which a revised setting of the control parameter during the batch production of the specific product is allowed. For example, the revising of the control parameter setting could only be allowed for control parameters that are not essential for the production of the specific physical product and/or that do not decrease a quality of the final specific product. In particular, control parameters referring to an amount, a packaging, a timing, etc., of the specific product can be allowed to be revised after the production has already started.

Since production change information can be taken into account during the production process, the parameter set for the current production can be changed directly, without the necessity of firstly stopping the production process and then starting it again including that all processes for generating a parameter set have to be performed again. Thus, also in this case a change in the production can be implemented more efficiently and unnecessary production steps can be prevented.

In a further aspect, a MES configured to generate control parameters for a process control system utilized for batch production of a specific product is presented, wherein the MES comprises a) a receiving unit adapted for receiving a product recipe from an ERP system, wherein the product recipe comprises information indicative of production requirements for a specific product in a batch production process, b) a parameter set generation unit adapted for generating a parameter set based on the product recipe, wherein the parameter set is configured to be implemented in the process control system, and c) an implementation unit adapted for implementing the parameter set into the process control system before starting the production of the specific product, wherein the MES is further configured to provide a product template, wherein the product template comprises a plurality of parameter settings for the control parameters with respect to a specific product, wherein the parameter set is generated based on the product template.

In a further aspect, a computer program product for generating control parameters for a process control system utilized for batch production of a specific product is presented, wherein the computer program product comprises program code means causing an MES as described above to execute a method as described above.

In a further aspect, a computer-implemented method for generating control parameters for a process control system utilized for batch production of a specific product is presented, wherein the method is configured to be used in a MES and comprises a) receiving a product recipe from an ERP system, wherein the product recipe comprises information indicative of production requirements for a specific product in a batch production process, b) generating a parameter set based on the product recipe, wherein the parameter set is configured to be implemented in the process control system, and c) implementing the generated parameter set into the process control system before starting the production of the specific product.

In a further aspect, a MES configured to generate control parameters for a process control system utilized for batch production of a specific product is presented, wherein the MES comprises a) a receiving unit adapted for receiving a product recipe from an ERP system, wherein the product recipe comprises information indicative of production requirements for a specific product in a batch production process, b) a parameter set generation unit adapted for generating a parameter set based on the product recipe, wherein the parameter set is configured to be implemented in the process control system, and c) an implementation unit adapted for implementing the parameter set into the process control system before starting the production of the specific product.

It shall be understood that the methods as described above, the manufacturing execution system as described above and the computer program product as described above, have similar and/or identical preferred embodiments, in particular, as defined in the dependent claims. It shall be understood that a preferred embodiment of the present invention can also be any combination of the dependent claims or above embodiments with the respective independent claim. These and other aspects of the present invention will be apparent from and elucidated with reference to the embodiments described hereinafter.

DETAILED DESCRIPTION OF EMBODIMENTS

Figure 1:
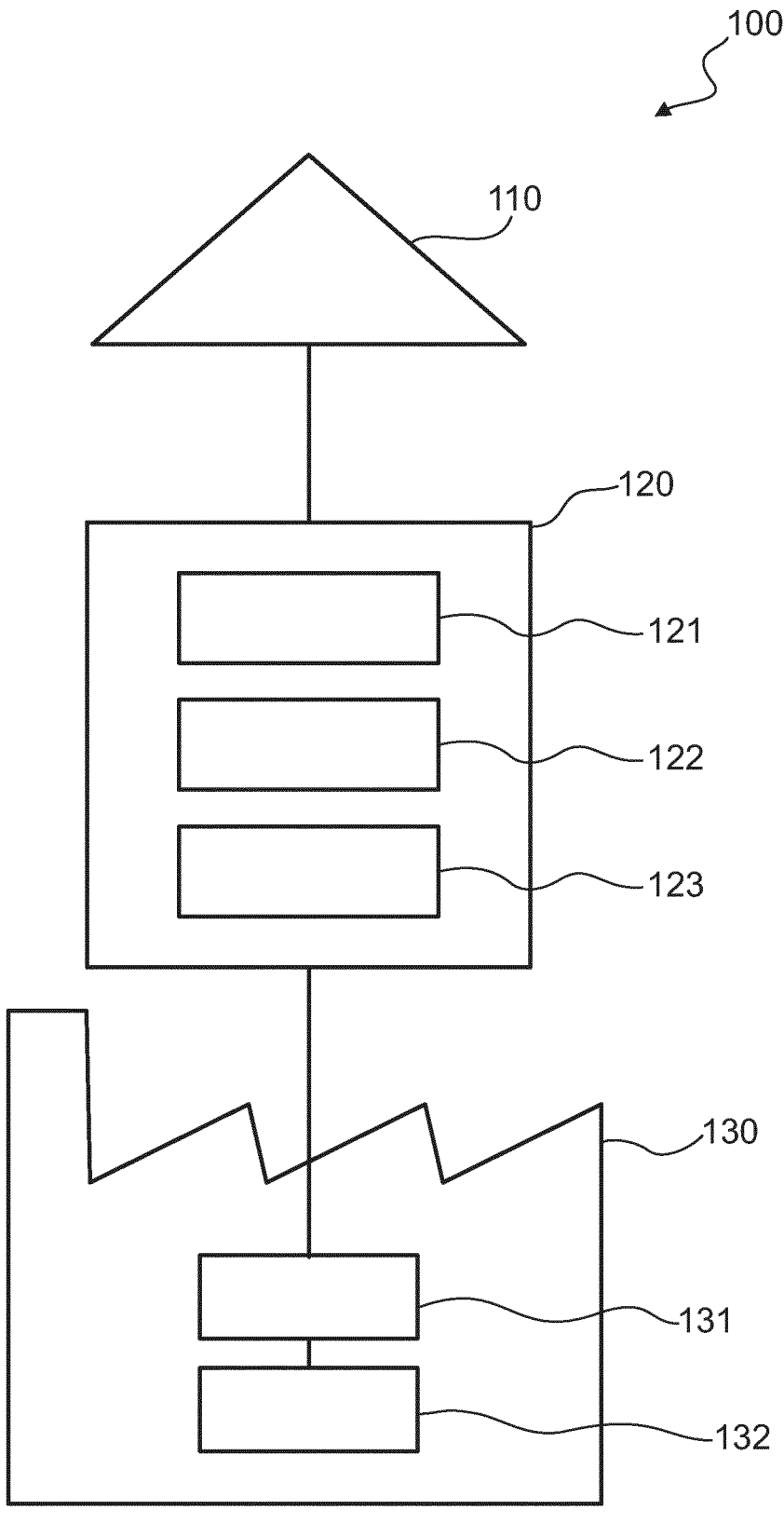
FIG. 1 shows schematically and exemplarily an embodiment of an enterprise control system comprising a MES configured to generate control parameters for a process control system.

FIG. 1 shows schematically and exemplarily an embodiment of an enterprise control system 100 used for managing and controlling product production in at least one production plant 130.

Generally, the production plant 130 can refer to any technical infrastructure that is used for an industrial purpose. The industrial purpose may be manufacturing or processing of one or more industrial products, i.e., a manufacturing process or a processing performed by the industrial plant. In this example, the industrial purpose refers to the production of a specific product. The specific product can, for example, be any physical product such as a chemical, a biological, a pharmaceutical, a food, a beverage, a textile, a metal, a plastic, a semiconductor. Additionally or alternatively, the specific product can even be a service product such as electricity, heating, air-conditioning, waste treatment such as recycling, chemical treatment such as breakdown or dissolution, or even incineration, etc. Accordingly, the production plant 130 may be one or more of a chemical plant, a process plant, a pharmaceutical plant, a fossil fuel processing facility such as an oil and/or a natural gas well, a refinery, a petrochemical plant, a cracking plant, and the like. The production plant 130 can even be any of a distillery, an incinerator, or a power plant. The production plant 130 can even be a combination of any of the examples given above provided the combination shares a process control system 131, for instance, a PLC, DLC or supervisory control and data acquisition (SCADA) system.

For performing the production process the production plant 130 comprises a technical infrastructure 132 which can be controlled by control parameters implemented by the process control system 131 into the technical infrastructure 132. The technical infrastructure 132 may comprise equipment or process units such as any one or more of a heat exchanger, a column such as a fractionating column, a furnace, a reaction chamber, a cracking unit, a storage tank, a precipitator, a pipeline, a stack, a filter, a valve, an actuator, a transformer, a circuit breaker, a machinery e.g., a heavy duty rotating equipment such as a turbine, a generator, a pulverizer, a compressor, a fan, a pump, a motor, etc. Moreover, the production plant 130 typically comprises a plurality of sensors that allow to measure operational parameters of the technical infrastructure 132, wherein the operational parameters can be utilized by the process control system 131 for controlling the production process in the production plant 130. The operational parameters measured by the sensors may relate to various process parameters and/or parameters related to the equipment or the process units. For example, sensors may be used for measuring a process parameter such as a flowrate within a pipeline, a level inside a tank, a temperature of a furnace, a chemical composition of a gas, etc., and some sensors can be used for measuring vibration of a turbine, a speed of a fan, an opening of a valve, a corrosion of a pipeline, a voltage across a transformer, etc. The difference between these sensors cannot only be based on the parameter that they sense, but can even be based on the sensing principle that the respective sensor uses. Some examples of sensors based on the parameter that they sense may comprise: temperature sensors, pressure sensors, radiation sensors such as light sensors, flow sensors, vibration sensors, displacement sensors and chemical sensors, such as those for detecting a specific matter such as a gas. Examples of sensors that differ in terms of the sensing principle that they employ may, for example, be: piezo-electric sensors, piezoresistive sensors, thermocouples, impedance sensors such as capacitive sensors and resistive sensors, and so forth.

Thus, a production plant 130 in the context of present teachings is a facility, sub-facility or infrastructure that comprises a dedicated process control system 131, for example, a DCS system. The production plant 130 may be part of a plurality of production plants. For example, the plurality of production plants can refer to a compound of at least two production plants having at least one common industrial purpose. Specifically, a plurality of production plants may comprise at least two, at least five, at least ten or even more production plants being physically and/or chemically coupled. The plurality of production plants may be coupled such that the production plants forming the plurality of production plants may share one or more of their value chains, educts and/or products. The plurality of production plants may also be referred to as a compound, a compound site, a Verbund or a Verbund site. Further, the value chain production of the plurality of production plants via various intermediate products to an end product may be decentralized in various locations, such as in various production plants, or integrated in the Verbund site or a chemical park. Such Verbund sites or chemical parks may be or may comprise one or more production plants, where products manufactured in the at least one production plant can serve as a feedstock for another production plant. In such an embodiment with the production plant 130 being part of a plurality of production plants, the process control system of each of the plants can be communicatively coupled or can even refer to the same process control system.

The production plant 130 is integrated into an enterprise control system 100 comprising a layered structure with a device layer, a control layer, an operational layer and a supervisory layer. The device layer may comprise the technical infrastructure 132 comprising, for instance, the sensors, equipment and process units, at least some of those are capable of generating data indicative of the physical processes within the plant. Such generated data may then be provided to the control layer comprising the process control system 131, e.g., by transmitting to the process control system 131 either at own initiative or in response to a request from the process control system 131. In cases where higher isolation between the layers is desired, the flow of data may be unidirectional, i.e., from technical infrastructure 132 to the process control system 131 at least for certain safety critical devices. The data may be provided either directly or indirectly to the process control system 131. The process control system 131 is adapted for controlling at least some of the physical processes of the plant 130 in response to at least a part of the generated data. Thus, the control layer may comprise a core process system including one or more processing devices and storage devices. The control layer includes the process control system 131 that may be executed on one of the one or more processing devices and storage devices provided in the control layer. The process control system 131 can comprise or be realized as one or more distributed processing and storage devices forming a PLC system or a DCS with control loops distributed throughout the respective production plant 130 to which the process control system belongs. Moreover, the process control system 131 may comprise or be part of real-time controls, a human-machine interface (HMI) or a supervisory control and data acquisition (SCADA) software. The device layer and the control layer of the plant, i.e. the technical infrastructure 132 and the process control system 131 are hence communicatively coupled. The process control system 131 is further communicatively coupled to the operational layer, in particular, to the MES 120 being part of the operational layer.

The operational layer is typically used for managing functions such as production and/or operation of one or more plants 130. Certain non-limiting representative examples of such functions are, configuring production sequence of products to be manufactured, production batch management, plant maintenance management, production planning, etc. The plant-specific control layer comprising the process control system 131 can provide supervisory data to the operational layer, in particular, to the MES 120, e.g., by transmitting to the operational layer either at own initiative or in response to a request from the operational layer. Furthermore, the supervisory data may be provided either directly or indirectly to the operational layer, in particular, to the MES 120. The supervisory data may even comprise at least a part of the control data. The operational layer by utilizing the MES 120 provides in this invention production data, in particular, a parameter set, to the plant-specific process control system 131 for controlling the operation and/or production of the respective plant 130. If a superordinate control layer for the production plant 130 is omitted, the process control system 131 is part of the device layer. In this case the operational layer, in particular, the MES 120, may directly provide control data, for instance, the parameter set, to the device layer for achieving the desired operation and/or production of the plant 130. The control data, in particular, the parameter set, can be used for controlling one or more industrial infrastructure 132 of the plant 130 such as any one or more of: actuator, heater, switch, furnace, reactor, etc., for achieving the desired operation and/or production specified by the operational layer via production data provided to the control layer.

The processing layers discussed herein, namely, the device layer, the control layer and the operational layer are often also called Level 1 layer, Level 2 layer and Level 3 layer, respectively. Further, a Level 4 layer is provided referring to a supervisory layer which relates to business logistics systems for managing the business-related activities of the manufacturing operation. The supervisory layer is provided with an ERP system 110 that can be adapted to establish a basic plant production schedule, material use, shipping and inventory levels, for instance, as part of a product recipe.

The above described systems and layer are generally connected to each other using the principles of a security network. The secure network may be a segregated network including more than two security zones separated by firewalls. Such firewalls may be network or host-based virtual or physical firewalls. The firewall may be hardware- or software-based to control incoming and outgoing network traffic. Here, predetermined rules in the sense of a white listing may define allowed traffic via access management or other configuration settings. Depending on the firewall configuration the security zones may adhere to different security standards. The secure network may be physically located within a plant 130 or between a plurality of plants 130. In some cases, however, the secure network may even extend beyond the physical location of the plants 130, for example, if any one or more of plant related databases, processing systems, or other computational services are implemented as one or more cloud-based services.

Generally, the device layer can be configured in a first security zone via a first firewall and the control layer can be configured in a second security zone via a second firewall. To securely protect the device layer, the first security level zone adheres to a higher security standard than the second security zone. Security zones or levels may adhere to a common industry standard such as lined out in Namur documentation IEC 62443. Similarly, the operational layer can be configured in a third security zone via a third firewall. The first and second security levels may adhere to a higher security standard than the third security level. Hence, the third and second security zones may be staggered in security standard as well. This can allow for higher security standards on the lower security zone of the control layer and lower security standards on higher security zones of the control layer.

To communicate with the operational layer, in particular, the MES 120, the plant 130 can comprise at least one network interface. For example, one or more plants 130 may provide their respective plant related data, or a part of the plant related data, to a distribution unit via the at least one network interface. The network interface may be any data access interface, for example an Open Platform Communications Data Access (OPC DA) interface. In some cases, the network interface can also be used for archiving plant information into an information management system or a data repository or an archive specific to that industrial plant 130.

In the following, the specific functions of the MES 120 in this invention will be described in more detail. In the embodiment shown in FIG. 1, the MES 120 comprises a receiving unit 121 that is adapted to receive a product recipe from the ERP system 110. The product recipe comprises information indicative of the production requirements for a specific product that should be produced in a batch production process by the production plant 130. For example, the product recipe comprises an identification of the specific product, one or more identifications of the basic materials that should be used for manufacturing the specific product, desired amounts that should be produced of the specific product, a packaging kind and size, a unique batch production number, etc. However, in some embodiments the production recipe might only comprise the specific product identifier or might comprise more details with respect to the production of the specific product, like the amounts of the basic materials used for production, specific production process requirements, etc. The receiving unit 121 provides the product recipe to the parameter set generation unit 122.

The parameter set generation unit 122 is adapted for generating a parameter set based on the product recipe. The parameter set comprises control parameters that allow, for instance, the process control system 131 of the production plant 130 to control the production process of the specific product. In particular, the control parameters of a parameter set can refer to specific parameter settings, i.e. parameter values, for the technical infrastructure 132 of the production plant 130, like temperature settings for a heater, power settings for a pump or motor, opening times for a valve, whether or not specific filters are inserted, etc. In an exemplary embodiment, the parameter set generation unit 122 is adapted to extract from the product recipe an identifier of the specific product and utilize this identifier to select from a product template storage a product template associated with the specific product identifier. The selected product template can then comprise preferable parameter settings, i.e. parameter values, for the control parameters that allow the production plant 130 to produce the specific product. Optionally, the production template provides in addition to the parameter settings also a link to a master template, wherein parameter settings that are common for a plurality of specific products, are stored in the master template. The product template, optionally together with the master template, preferably provides all parameter settings necessary for producing the specific product. However, the product template, optionally together with the master template, can also comprise only some of the parameter settings for the control parameters. In an embodiment, some control parameters might be settable only directly based on the production recipe. For example, a unique batch product identifier, an amount of the specific product to be produced, or a packaging size can be provided by the product recipe and directly extracted by the parameter set generation unit 122 from the product recipe. Such control parameter directly provided by the product recipe can thus directly be utilized for setting the control parameters in the parameter set referring to this information based, for example, on predetermined rules, lookup tables, or functional relationships of this information to the control parameters. Such rules, functional relationships or lookup tables can be production plant-specific, for instance, based on the specific technical infrastructure 132 of the production plant 130 utilized for the batch production.

If a template is used for generating the parameter set, the parameter set generation unit 122 can be adapted to extract from the template and also optionally, by following the link to the master template, from the master template the parameter settings for the control parameters that allow to control the production of the specific product in the production plant 130. Optionally, further control parameters can be set based on the information provided by the product recipe as explained above. All set control parameters are then provided in form of a parameter set. The parameter set generation unit 122 can then be adapted to provide the generated parameter set to a user, for instance, utilizing a display of a tablet or other computing device. A user can then be requested to check and verify the parameter set. Moreover, in a preferred embodiment some of the control parameter settings of the parameter set are indicated to the user as being settable and/or amendable by the user, whereas other control parameter settings might not be settable and/or amendable by a user, for instance, due to being essential for the production of the specific product, and are then provided to the user, for instance, in the form of place holders, since it is not necessary for the user to further check these unamendable parameter settings. After having checked and optionally amended one or more of the control parameter settings of the parameter set, a user can confirm that the parameter settings of the parameter set are correct for the production of the specific product and release the parameter set to be implemented into the process control system 131 of the production plant 130.

The implementation unit 123 is adapted to then implement the released parameter set into the process control system 131 before starting the production of the specific product. For example, the implementation unit 123 can communicate the parameter set to the process control system 131 using one or more of the above exemplarily described communication possibilities between the MES 120 and the process control system 131 of the production plant 130. Moreover, the implementation unit 123 can be adapted to control that the parameter set is correctly implemented by the process control system 131, for instance, via feedback provided from measurements performed by the technical infrastructure 132 of the production plant 130 and communicated from the process control system 131 to the MES 120. Based on this feedback, the implementation unit 123 can be adapted to notify the parameter set generation unit 122 that one or more of the control parameters has to be revised. For example, if the feedback of the process control system 131 suggests that short term changes in the technical infrastructure 132 of the production plant 130 have occurred, for instance, due to failures in some parts of the technical infrastructure 132, the parameter set generation unit 122 can be adapted to use predefined rules that are based on the technical details of the technical infrastructure 132 and/or the information provided by the feedback from the process control system 131 of the production plant 130 to revise the control parameter settings and adapt the control parameter settings in accordance with the provided feedback. The parameter set generation unit 122 can then again be adapted to present the new revised parameter set to a user and after having been released the new parameter set can then again be implemented by the implementation unit 123 into the process control system 131 of the production plant 130. Based on the implemented parameter sets, the production plant 130 can then produce the specific product.

Figure 2:
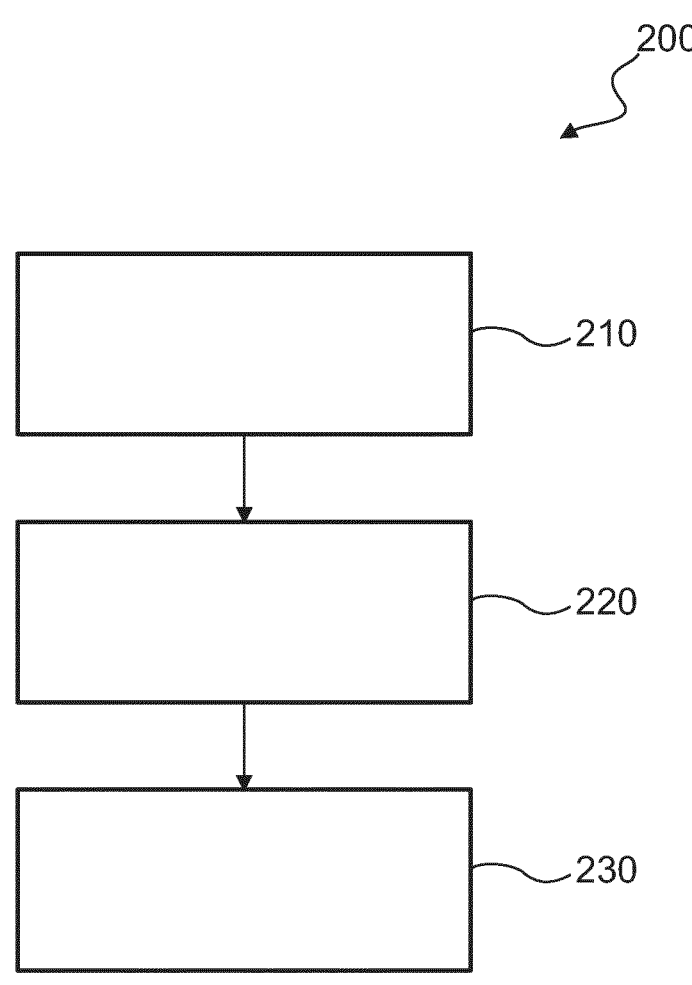
FIG. 2 shows a flow chart exemplarily illustrating an embodiment of a method for generating control parameters for a process control system.

FIG. 2 shows schematically and exemplarily a flow chart illustrating an embodiment of a method for generating control parameters for a process control system. The method 200 is used, in particular, executed, by an MES, for instance, the MES 120 discussed above with respect to FIG. 1. The method 200 comprises a first step 210 of receiving a product recipe from an ERP system, wherein the product recipe comprises information indicative of production requirements for the specific product in the batch production process performed, for instance, by the production plant 130. This computer-implemented method step 210 can, for instance, be executed by a receiving unit 121 in accordance with the functions described with respect to the receiving unit 121. Further, the method 200 comprises a step 220 of generating a parameter set based on the product recipe, wherein the parameter set is configured to be implemented in a process control system of a production plant. This step 220 of generating a parameter set can be executed, in accordance with the above described examples, by the parameter set generation unit 122. In a last step 230, the method 200 comprises implementing the generated parameter set into a process control system before starting the production of the specific product by a production plant. This implementing step 230 can be performed by the implementation unit 123 in accordance with the functions of the implementation unit 123 as already described above.

Figure 3:
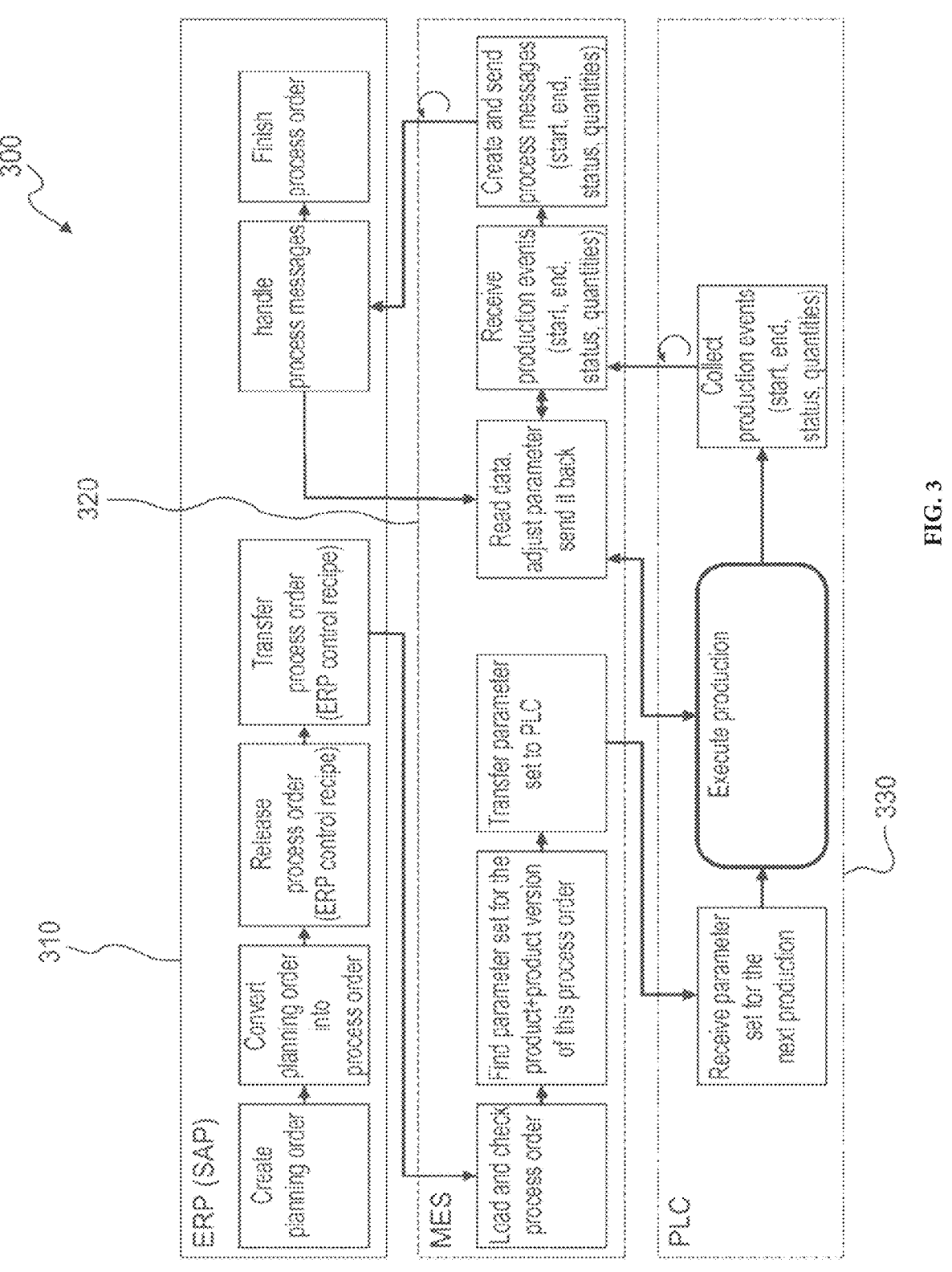
FIG. 3 shows exemplarily and schematically a more detailed embodiment of a method for generating control parameters for a process control system.

FIG. 3 shows a more detailed example of an embodiment of a method for generating control parameters for a process control system, wherein in FIG. 3 the integration of the method into the overall enterprise control system is emphasized. In particular, the method 300 is schematically sorted into three layers of the enterprise control system. The uppermost layer 310 refers to the Level 4 layer, the supervisory layer, as defined above, and comprises in this example the ERP system which can be realized, for instance, as an SAP system. The middle layer 320 refers to the Level 3 layer, i.e. the operational layer, as defined above, and comprises the MES executing a method, for instance, as described with respect to FIG. 2. The lowest layer 330 refers to the Level 1 and/or Level 2 layer, i.e. the control layer, as defined above, and comprises the process control system, for instance, a PLC system.

In this detailed example, the method 300 starts in the supervisory layer 310 with the ERP system creating a planning order for the production of one or more specific products, which is then converted into a process order for controlling and managing the different processes necessary for producing the one or more specific products. The process order can then be checked and verified and can then be released in form of an ERP control recipe, i.e. an ERP product recipe, for the one or more specific products that should be produced. The process order, in particular, the ERP control recipe, is then transferred to the MES in the operational layer 320. The MES receives the ERP control recipe, wherein this receiving can comprise a loading and checking of the ERP control recipe, for instance, in accordance with predetermined security requirements. In the following step, the MES generates a parameter set for the specific product and/or product version as identified in the ERP control recipe, for instance, by searching and retrieving a template comprising the parameter settings for the control parameters of the parameter set from a product template storage. The generated parameter set is then implemented, for instance, by transferring the parameter set to the PLC system. Thus, the PLC system in the control layer 330 receives the parameter set for the production of the specific product and performs the production of the specific product based on the implemented parameter set.

Before, during and after the start of the production of the specific product, the PLC controls and manages the execution of the production, for instance, by collecting production events. These production events can refer to a start or an end of the production, a status of the production, current quantities of the produced specific product, failures in the technical infrastructure during the production of the specific product or any other event that could occur during the production. Such events can be provided by the PLC as feedback to the MES in the operational layer. The MES then receives these production events and based on rules for the specific events can create and send process messages of the production events to the ERP system in the supervisory layer 310. Moreover, the MES can also be adapted to revise one or more parameters of the parameter set based on the feedback, i.e. based on the received production events, for instance, by adjusting a parameter setting of a control parameter of the parameter set to an unforeseen technical event and send the revised and adjusted parameter set back to the PLC to be implemented for the further production of the specific product. However, also the ERP system can be adapted to notice, based on the process messages received from the MES, that a revising of the parameter set may be necessary and instruct the MES accordingly. The process ends if the control event and thus the process messages indicate that the desired specific product has been produced in the respective quantity and that the execution of the production is thus finished. The ERP system can then initiate the processes that are necessary for finishing the process order, like, for instance, informing a customer, storing respective production data, etc.

Generally, a batch production can be defined as a production of similar products with respect to a setting of an industrial infrastructure, for instance, comprising chemical reactors or extruders. However, a batch production can also be distinguished from a continuous production by the fact that it does not produce the exact same product all the time. The differences in the product produced during a batch production, from a production viewpoint, can vary from almost insignificant, e.g. different product container, to incredibly significant, e.g. producing black-colored products to white-colored products. Unlike in continuous productions where the production parameters, i.e. control parameters, are generally kept constant to ensure a steady quality of the product, in a batch production the industrial infrastructure needs to be specifically configured for each batch process, i.e. for each specific product. These might mean the physical exchange of parts, e.g. grinders of different granularities, but also control parameters controlled by controlling software, e.g. a heater temperature or RPM of a grinder. One of the challenges is to ensure an order of production that creates as few/short maintenance periods as possible. This is done, for instance, on a supervisory level in an ERP system, like SAP.

Another challenge is to configure the industrial infrastructure for each product to be produced with the correct parameter set and put all the parameters into the execution units. Depending on the industrial infrastructure many control parameters that might differ for every specific product or even dependent on the consumption materials, e.g. a different consumption material may have to be grinded longer than another even though the end product is the same, have to be set and implemented. To ensure the correct production of the intended specific product, it is sometimes necessary to rely on the information from the product recipe stored in the ERP system. It defines for example which precise consumption materials are to be used. Only with this information at hand it can, for instance, be prevented that unwanted/disallowed consumption materials are entered into the process. While generally a process control system, like a DCS, can manage a variety of recipes to be produced, it lacks in principle an integration into the ERP system and thus might be missing an access to vital information for the execution process.

Another challenge of batch production in comparison to continuous production is that each start of a new batch might not yield the desired results from the start due to the previous use or even not-use of the industrial infrastructure, e.g. components might be cold for a while, which means that parameters need to be adapted on-the-fly to reach the wanted results. This is done before the production of that batch starts. An example would be that a heater needs to be heating to a higher/lower temperature than what is usually done. Moreover, when several batches of similar products or same products, for instance, with different target size containers, are produced, certain parameters should not be changed again by an automated system just because formally a second/third batch has started. This means that the same basic production recipe can sometimes refer to different parameter sets for the industrial infrastructure depending on if it is the first production or if it is a follow-up production to an already running batch production.

The invention therefore provides a missing link between the ERP system and the process control system, for instance, the DCS or the PLC system, by defining how the ERP data, i.e. the production recipe, can be executed in the production process. An important advantage of the above described method according to the invention refers to the security of the production process. In particular, it is desired that only neighboring levels of the production pyramid are allowed to communicate with each other. For instance, working with an ERP system and working with a process control system of a production plant can be kept as two different jobs where neither has easy access to the computer interfaces of the other, when utilizing the above described invention providing the parameter sets as part of the MES layer. This allows for a higher security of the production process, while avoiding errors in the transfer of the product recipe into the production of the product.

The invention suggests in particular solving the above problems by executing the method as part of the MES that is adapted to communicate with both the ERP system and the process control system. Preferably, the MES is adapted to communicate with the ERP system SAP R/3 and SAP S/4 HANA as well as any DCS/PLC system that understands the industry standard protocol OPC DA. Moreover, it is preferred that the parameter sets are generated in a multi-layered process that allows a user a maximum of freedom and ease of use to create parameter sets that are as similar or as different as they need to be. Even more preferably, the method for generating parameter sets is part of or comprises a visualization computer program with a human-machine interface.

A preferred aspect of the invention refers to the utilization of templates for generating a parameter set. Generally, a product template can be designed in advance of an actual production, for instance, by a process manger that is familiar with the technical infrastructure of a plant and can then be stored on a template storage. As already mentioned above, many batch products are quite similar in the way they are produced which also means that a substantial part of the parameter settings is identical when similar products are produced. The best example here is a product that is identical yet is filled into differently sized containers. From an ERP perspective this yields into two different product numbers and from a production perspective only the very last part of the production process needs to differ, e.g. in what cycles does the filling valve open and close. In this case, it is advantageous to utilize a product template comprising a link to a master template that covers all the identical parameter settings, wherein the product template covers the product-specific parameter settings. However, the use of a master template is optional and also product templates without master templates can be utilized for generating the parameter settings.

It is further preferred that in some embodiments user elements are defined that refer to parameters that can be set in a definite way by a user, for instance, a process manager, e.g. 300° C. for a heater, while further system elements can be defined, for instance, as parameters that can only be determined based on the product recipe that is sent by the ERP system. For these parameters, placeholders can be provided in a product template. In this way a user, for example, a process manager, does not need to create parameter sets for every variation of recipe that is to be produced. Moreover, some parameters may have to be set for an industrial infrastructure and some can be omitted if the batch to be started is a follow-up one. For example, the product number and batch number may be necessary to set for each specific product such that a label printer at the end of the production can print the correct labels for the product containers. However, a temperature of a heater might be the same also for the next product and thus does not have to be set anew.

Preferably, the method comprises also a notification to the MES once a new recipe is released by the ERP system before receiving the recipe into the MES. The MES can then be adapted to automatically analyze the recipe and check its internal consistency for planning mistakes, e.g. missing product in the recipe. In a preferred embodiment, the MES can be adapted to read the product number and the product version from the recipe and find the matching product template as part of the step generating the parameter set. The MES can then automatically create, i.e. generate, a parameter set from the information provided by the template, in particular, from the parameter settings provided by the template, and, if present, can replace all placeholders with the corresponding values from the product recipe. This parameter set can then, for instance, be stored before being implemented in the process control system, wherein this step is preferably executed when the production actually starts.

Preferably, the parameter set can be provided to an operator. A visualization can then be provided to the operator as part of the MES that allows the operator to inspect the recipe that was received from the ERP system and/or the parameter set that was automatically created. As long as production has not started yet the operator can be able to overwrite parameters of the parameter set with new values if there is a reason to do so.

When the operator decides to start the production for this recipe, the parameter set is accepted and the parameter values, i.e. parameter settings, are implemented into the process control system and thus into the technical infrastructure using, for instance, an OPC DA protocol to the endpoints that were defined in the parameter set. Preferably, this step of implementing comprises also a checking that the setting of the parameters was successful and that the parameter value was correctly set.

Preferably, while one batch is currently produced, an operator can select another recipe that was received from the ERP system and declare it as a continuous successor. In this case, the method can comprise generating the parameter set for the successor such that only differing parameter settings are provided as parameter set to the process control system, while all other parameter values are kept the same. Thus, once the current batch is finished only the differing parameters settings have to be implemented before the start of the next one.

Preferably, the method is based on the principle that "once used cannot be changed anymore". This is advantageously both for documentation purposes as well as for an ease-of-use. This way the actually used parameter values are documented and if they prove to yield a better product can then be used to be the new template values. It also documents under which conditions a batch was produced.

This principle leads, for instance, to the following aspects of the invention. Preferably, a) a master template and/or product template can be changed as long as no parameter set is created from it, and/or b) a parameter set can be changed as long as the production is not started. Once production has started, the parameter values determined by the parameter set applied to the technical infrastructure are locked, i.e. stored. However, this preferred principle does not prevent changes of parameter settings during actual production. In some cases, if an operator chooses so and has authorization to do so, parameter settings might still be changeable at a part of the technical infrastructure directly, wherein it is then preferred that the method comprises also storing the changes made by the operator. This way a used parameter set can be looked up in the future either to check, for instance, why a batch has not yielded a desired quality or to compare on how parameters have changed over the course of time, e.g. signaling equipment decay. Moreover, it is preferred that a parameter set can also be exported to a spreadsheet program, e.g. Microsoft Excel for a further production documentation. Moreover, for ease-of-use templates can also be copied, so even when a template is already in use a newer version can be created from it using the previous template as template.

In a further preferred embodiment the method also comprises changing, i.e. revising, parameter settings while production is running. This can be done using a parameter configuration tool but also directly in the technical infrastructure. Preferably, parameters that are allowed to be revised are indicated in the parameter set, for instance, by marking them visually.

There are several reasons in which such a revising of parameter values can be advantageous. For example, in a case an extension of a production amount might be required, either because the same customer extends their order or another customer orders the same product. To increase asset effectiveness, it may be reasonable to attach the new order to the current one and just have the batch production running longer and produce the new order before other orders that would need a change in configuration of the technical infrastructure. Thus, in this case it is preferred that a parameter value setting the production amount, i.e. a production time, is marked as being revisable such that this parameter value can then be adapted to the new order. In another example, for ensuring a quality of a product, feedback may be provided, for instance, from an external quality system, e.g. SAP QM, or an internal diagnosis of the production process performed by the process control system which may indicate the necessity of revisiting parameter values of the production process while production is running. In a further example, a machine defect may also not necessarily lead to a production stop but rather to a redirect of the workflow and thus to a change of parameter settings of the current production. Also, an unforeseen shortage of a specific raw material, e.g. due to quality issues, may lead to a change in production when it is already running and thus to a change of parameter values to accommodate for the replacement material.

It is preferred that the method comprises a recording of changes of parameter values during production comprising, for instance, a reporting of the changed parameters from the process control to the MES such that they can be protocolled as the actual used values for both documentation purposes as well as future uses, for instance, as new template values, if desired.

Although in the above described embodiments the parameter sets were generated in particular based on one or more stored product templates, in other embodiments such product templates can be omitted. For example, the product recipe can comprise one or more of the parameter settings and the parameter set can be generated by retrieving these parameter settings and assigning these parameter settings to the respective control parameters of the parameter set. Moreover, rules and functional relations between the information provided by the product recipe and the parameter settings of the control parameters necessary for producing a specific product can be utilized for generating the specific product. Such rules and functional relationships can be determined, for instance, based on the experience of users of the method or based on more sophisticated computational decision systems, like, for instance, known machine learning systems. Such machine learning systems can, for instance, be trained by providing a plurality of product recipes and also a plurality of parameter sets associated with the product recipes and provided, for instance, by experienced users or that have been used in the past for the production of the respective product recipe as learning cases.

Although in the above embodiments the production plant comprises a process control system with a control layer and a device layer, in some embodiments the control layer can be omitted such that the process control system is directly performed as part of the technical infrastructure, for instance, by internal device process controlling. In this case, the parameter set is directly implemented into the respective device control of the devices of the technical infrastructure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

A single unit or device may fulfil the functions of several items recited in the claims. The mere fact that certain measures are recited in mutually different dependent claims does not indicate that a combination of these measures cannot be used to advantage.

Procedures like the receiving of the product recipe, the generating of the parameter set, or the implementing of the generating parameter set, etc., performed by one or several units or devices can be performed by any other number of units or devices. These procedures can be implemented as program code means of a computer program and/or as dedicated hardware.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a method for generating control parameters for a process control system utilized for batch production of a specific product. The method is configured to be used in a MES and comprises a) receiving, by a receiving unit, a product recipe from an ERP system, wherein the product recipe comprises information indicative of production requirements for a specific product in a batch production process, b) generating, by a generating unit, a parameter set based on the product recipe, wherein the parameter set is configured to be implemented in the process control system, and c) implementing, by an implementing unit, the generated parameter set into the process control system before starting the production of the specific product.

The invention claimed is:

1. A non-transitory computer readable medium for generating control parameters for a process control system utilized for batch production of a specific product, wherein the non-transitory computer readable medium comprises program code means causing an MES to execute a method comprising:

utilizing a processor to execute instructions stored in memory to perform the following steps:

receiving a product recipe from an enterprise resource planning (ERP) system, wherein the product recipe comprises information indicative of production requirements for a specific product in a batch production process, generating a parameter set based on the product recipe, wherein the parameter set comprises a data structure having parameter fields and corresponding values for control parameters usable by the process control system to control production of the specific product, implementing the generated parameter set into the process control system before starting the production of the specific product, and accessing a product template stored in a product template storage, wherein the product template comprises a plurality of parameter settings for the control parameters with respect to the specific product, and setting values in the parameter set based on the parameter settings of the product template.

2. The non-transitory computer readable medium according to claim 1, wherein the product template comprises a) at least one user element referring to a parameter setting that is settable and/or changeable by a user input and/or b) at least one system element referring to a parameter setting that is not settable and/or not changeable by a user input, wherein a system element is provided in form of a placeholder to the user in the product template, in order to indicate that the respective parameter setting of the product template is not settable and/or not changeable by the user.

3. The non-transitory computer readable medium according to any of the preceding claim 1, wherein the product template comprises a link to a master template such that at least some of the parameter settings are provided as part of the master template, wherein in a master template parameter settings are provided that are common for a plurality of specific products.

4. The non-transitory computer readable medium according to claim 3, wherein the method comprises generating the parameter set based on the product template by extracting the parameter settings provided by the product template and by following the link to the master template and also extracting the parameter settings provided by the master template, wherein the parameter set then comprises the parameters provided by the product template and the parameters provided by the master template.

5. The non-transitory computer readable medium according to claim 3, wherein a master template is generated by storing on a master template storage at least a part of a product template comprising parameter settings for a specific product that are common also to at least one other specific product.

6. The non-transitory computer readable medium according to claim 1, wherein the method further comprises providing information indicative of a previously performed batch production process, wherein the parameter set is generated further based on the provided information indicative of a previously performed batch production process.

7. The non-transitory computer readable medium according to claim 6, wherein the information indicative of a previous batch production process comprises information indicative of a difference between the previous batch production process and the current batch production process or the difference is determined based on the information indicative of a previous batch production process, wherein the information indicative of a previous batch production process is indicative of the one or several previously employed parameter sets, wherein the parameter set is generated based on the difference such that the parameter set comprises only control parameters differing from the parameters of the previously employed parameter set.

8. The non-transitory computer readable medium according claim 1, further comprising locking the parameter set, after the production of the specific product has started, by storing the parameter set as being used during the production of the specific product.

9. The non-transitory computer readable medium according to claim 1, further comprising locking a product template, after the parameter set has been generated based on the product template, by storing the product template.

10. The non-transitory computer readable medium according to claim 1, further comprising providing feedback information from the process control system during the batch production of the specific product, wherein based on the feedback information the parameter set is revised.

11. The non-transitory computer readable medium according to claim 1, further comprising providing production change information from the ERP system during the batch production of the specific product, wherein the production change information is indicative of a desired change in the production of the specific product, wherein based on the production change information the parameter set is revised.

12. The non-transitory computer readable medium according to claim 10, wherein the generating of the parameter set comprises indicating at least one parameter in the parameter set for which a revised setting of the control parameter during the batch production of the specific product is allowed.

13. A manufacturing execution system (MES)—for generating control parameters for a process control system utilized for batch production of a specific product, wherein the MES comprises:

a processor and memory storing instructions that, when executed by the processor, cause the MES to:

receive a product recipe from an ERP system, wherein the product recipe comprises information indicative of production requirements for a specific product in a batch production process, generate a parameter set based on the product recipe, wherein the parameter set comprises a data structure having parameter fields and corresponding values for control parameters usable in the process control system to control production of the specific product, implement the parameter set into the process control system before starting the production of the specific product, wherein the MES is further configured to provide a product template, wherein the product template comprises a plurality of parameter settings for the control parameters with respect to a specific product, wherein the parameter set is generated based on the product template.

\*  \*  \*  \*  \*